Patented Apr. 19, 1927.

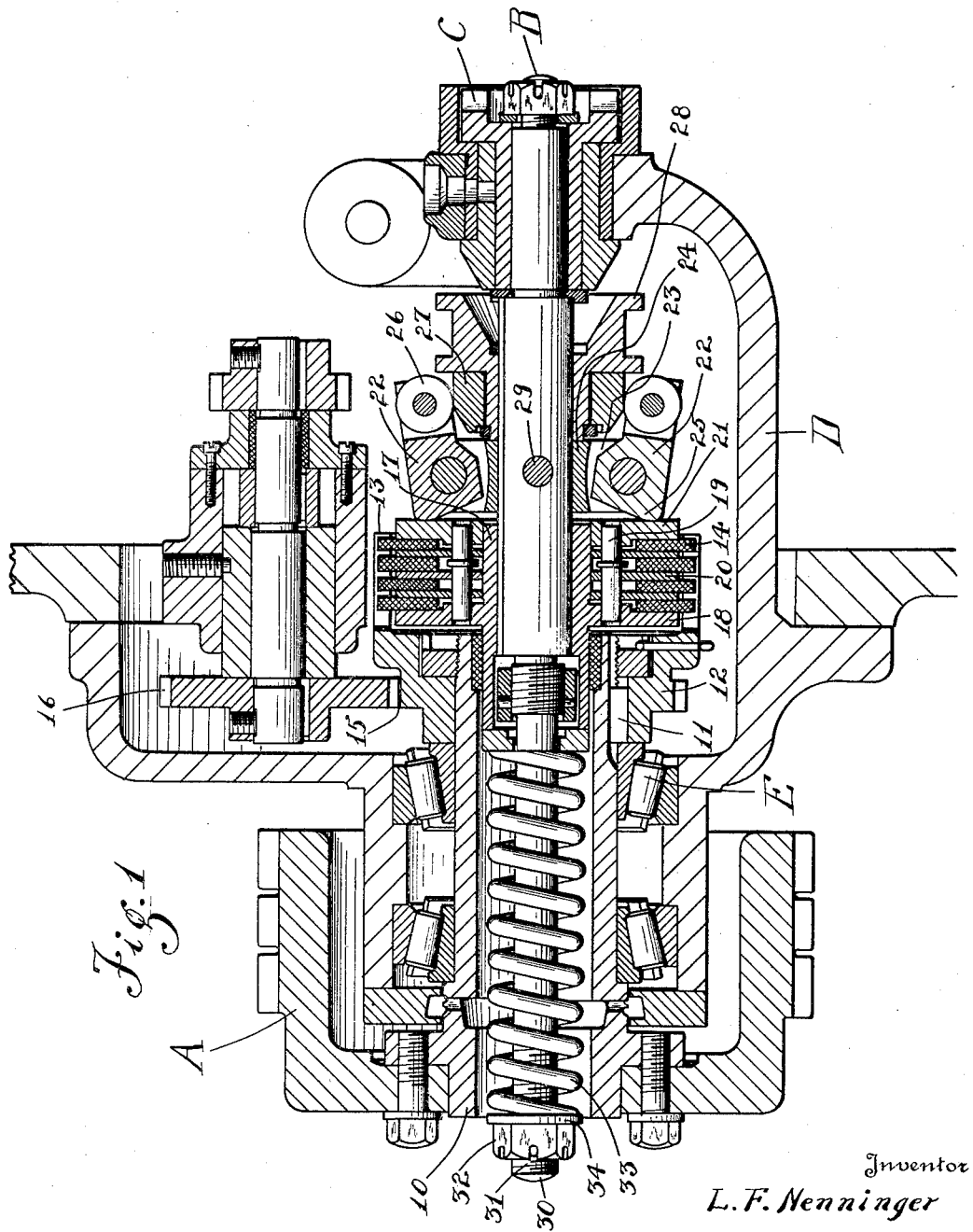

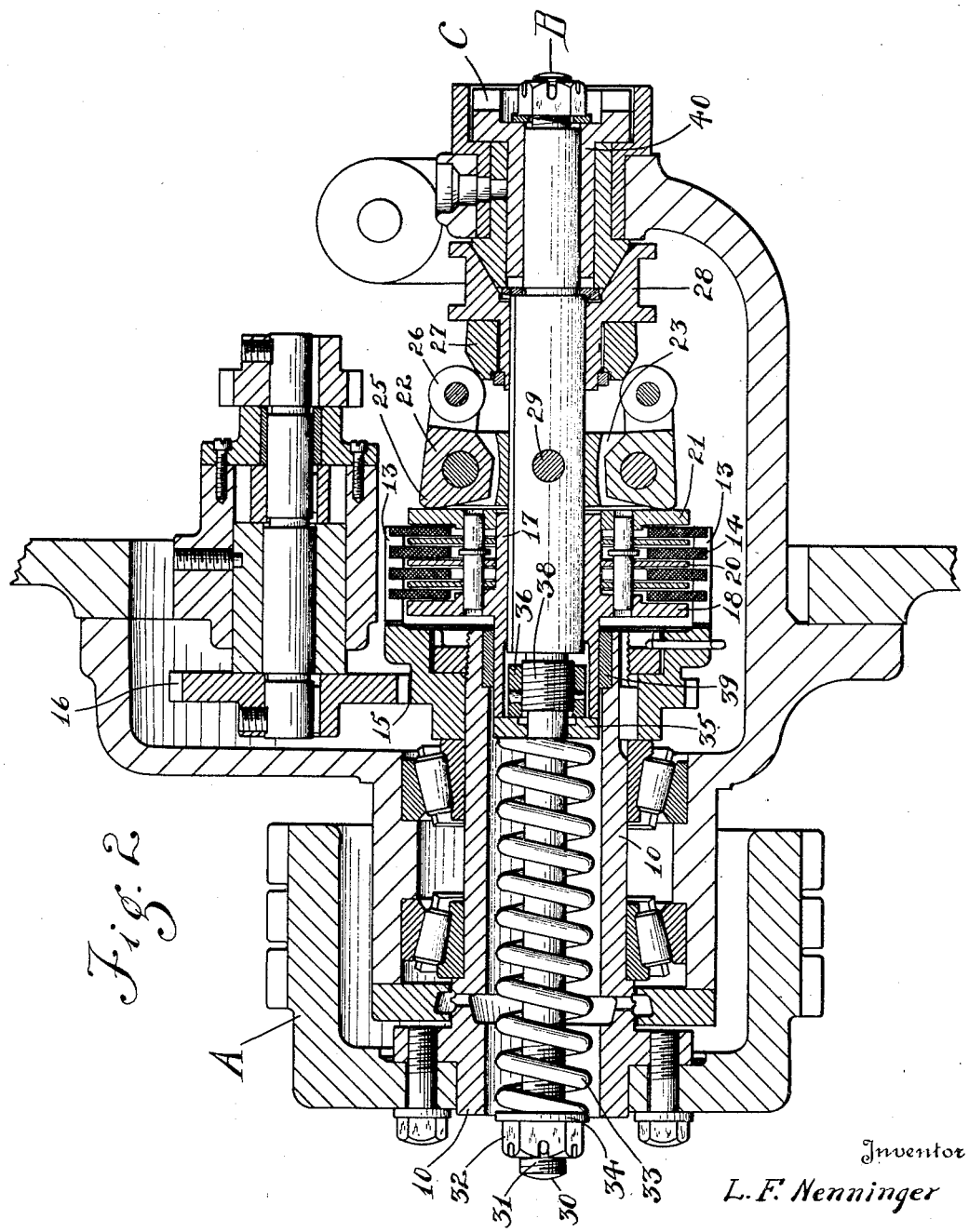

1,625,738

UNITED STATES PATENT OFFICE.

LESTER F. NENNINGER, OF CINCINNATI, OHIO, ASSIGNOR TO THE CINCINNATI MILLING MACHINE COMPANY, OF CINCINNATI, OHIO, A CORPORATION OF OHIO.

MACHINE TOOL CLUTCH.

Application filed May 9, 1925. Serial No. 29,202.

This invention relates to improvements in clutch construction and more especially to such structures particularly adapted for use in connection with milling machines and similar machine tool structures.

In the manufacture of clutch mechanisms in the past use has ordinarily beeen made of one of two general principles. Either the clutch structure has been of the type employed in motor vehicles, for example, in which a release member is provided for disengagement of the clutch and in which resilient means are employed for operatively associating the driving and driven portions of clutch devices; or else a positive clutch has been employed in which the parts were forcibly locked together by a positive or non-yielding mechanism.

These prior art structure have been open to certain objections in that the resiliently actuated type of clutch cannot be satisfactorily disengaged and held in released position without the employment of special locking mechanism. On the other hand the positive type of clutch mechanism is open to the objection that wear of the parts has ordinarily required disassembling of the clutch unit for re-adjustment. Moreover, with this type of mechanism there is no variable pressure possible but on the contrary a great liability of breakage of the parts when new due to forcing of the same into unduly tight clamping engagement. Also as the parts wear or compress there is no automatic take-up to compensate for this wear and a consequent tendency toward and liability of slippage.

It is the object of the present invention to obviate the several defects of the above mentioned types of clutches and to provide a novel and improved clutch mechanism which may be positively engaged and disengaged but which, irrespective of wear, will have a substantially uniform limit of engaging pressure and will have an automatic take-up compensating for wear of the several parts.

A further object of the invention is the provision of an improved structure which may be positively shifted from engaged to disengaged position or vice-versa and in which a variable movement of the clamping and shifting mechanism will produce only a predetermined maximum frictional pressure engagement between the parts, Another object of the invention is the provision of an improved machine tool clutch which shall be so constructed and arranged that necessity for adjustment of the several parts thereof during the life of the machine will be obviated.

Other objects and advantages of the present construction should be readily apparent by reference to the following specifications taken in connection with the accompanying drawings and it will be understood that I may make any modifications in the specific structural details hereinafter described within the scope of the appended claims without departing from or exceeding the spirit of the invention.

Figure 1 represents a longitudinal sectional view of the clutch with the parts in engaged relation, and Figure 2 represents a similar view with the clutch released.

Broadly considered the present invention comprises a driving member such as the chain sprocket or pulley "A" and the separate spindle "B" intended to be driven therefrom and provided with a connector "C" for the driven mechanism which may be the power drive of a milling machine, grinder, or like machine tool, for example. The mechanism for operatively connecting these parts comprises a pair or plurality of suitable co-acting clutch elements together with a device for positively clamping the parts in engagement or for disengaging the parts to allow relative movement thereof.

As distinct from former mechanisms, however, in place of the clamp being in the form of a rigid, non-yielding structure, the clamp mechanism includes a spring or like device which will exert a yielding follow-up pressure within pre-determined limits. In other words when the clamping pressure is released means are provided to limit the expansion of the spring device so that the parts are free from its pressure. On the contrary when the clamp is tightened the free play is first taken up and then the final tightening action is exerted against a spring pressure which limits the positive force that may be applied to the clutch elements. The range of spring movement is such that its take-up will compensate for normal wear of the parts and at the same time it is distributed over sufficient area that the clamping pressure or resistance offered by the spring will be substantially constant and uniform irrespective of the additional expansion required on account of such wear.

In the embodiment of the invention which has been chosen for purposes of illustration, the clutch frame member "D" has the suitable anti-friction bearing "E" for the sleeve 10 which has bolted thereto a sprocket or pulley "A" by which power is applied. Keyed to the sleeve as at 11 is the clutch spider 12 having arms 13 received in suitable slots in the major clutch plates 14. This member 12 is shown as provided with the gear portion 15 serving to constantly drive pinion 16 and its associate parts at any time that rotative power is applied to pulley "A". The present mechanism is designed to control the actuation of spindle "B" and the parts which may be connected therewith as by the member "C". For the purpose of such connection a sleeve member 17 is splined or otherwise secured on spindle "B". This sleeve has the outstanding peripheral flange 18 having sockets for the clutch plate pins 19 which extend loosely through the inner clutch plates 20 disposed intermediate the major clutch plates 14 in the manner of the usual multiple disc clutch structure. Mounted on the pins 19 in addition is the clutch clamp plate 21 actuated by clutch fingers 22. Fingers 22 are pivoted in slots 23 of the clutch finger hub 24 and have on one end the cam portions 25 for engagement with plate 21 and at the opposite end rollers 26 adapted to ride on actuating cam ring 27.

Cam ring 27 is carried by the clutch spool 28 slidably mounted on spindle "B" and longitudinally actuable through the medium of a suitable shifting yoke. Cross pin 29 secures the clutch finger hub 24 against any rotation or longitudinal movement with respect to spindle "B" so that movement of the clutch spool will cause the cam 27 to lift the rollers and shift the parts into clamping position as shown in Figure 1 or to substantially release the rollers and allow separation of the parts as shown in Figure 2.

Attention is invited to the fact that the clutch clamping mechanism is an entirely separate and distinct unit from the sleeve 10 and associated parts, the only connection being through the interengagement of the arms 13 and discs 14. Consequently there is no end pressure exerted by the clutch against the sleeve and its bearings.

In place of the clutch pressure being taken up by the sleeve, improved mechanism forming part of the subject matter of this invention is employed. Spindle "B" is provided with a reduced portion 30 threaded as at 31 to engage nut 32 and having mounted thereon the clutch actuating spring 33. The movement of this spring on portion 30 is limited in one direction by washer 34 and nut 32. At the other end the spring bears against the washer-like member 35 which when the clutch is released has as its limit of expansion the engagement of member 35 with nut 36 adjustably mounted on the intermediate threaded portion 38 of the spindle. When in released position, therefore, the expansion force of spring 33 is directed axially of spindle "B" between the washers 34 and 35. On the contrary when cam 27 is moved to the left as illustrated in Figure 1 it spreads rollers 26 and rocks the cam fingers to actuate the heads 25. This action forces clutch clamp plate 21 to the left taking up the spaces between the several clutch discs 14 and 20 and pressing this as an entirety against the flanges 18. The continued pressure will move the flange and consequently its sleeve 17 to the left, when the end of the sleeve will contact with washer 35 and somewhat compress spring 33. It will thus be seen that the actual clamping engagement between the several clutch discs is the result of the pressure applied by spring 33 through collar 35 and sleeve 17 to flange 18. On the other hand the forcible movement of the parts into this clamping engagement and the positive release of the parts permitting of separating movement thereof independent of the pressure of the spring is effected solely by rocking of the clutch fingers 22.

It is to be understood that adjustment of collar 36 is made in initially setting up the clutch or at any time that the machine is disassembled, this adjustment serving to limit the expansive movement of the spring 33 on the spindle and consequently the amount of follow-up action the spring will have in the release direction of the clutch. Likewise the initial pressure of the spring is varied by the adjustment given to nut 32 which is shown as disposed in an accessible position at the outer end of sleeve 10 so that the spring pressure may be adjusted and varied if desired without taking down the machine, although such adjustment is ordinarily found to be unnecessary during the life of the machine.

Particular attention is invited to the fact that the spring and the clamping members as well as the interengaging series of discs are all carried by the spindle member and that the intermediate set of discs 14 are either loosely or tightly held between the spindle discs 20 so that the entire clutch mechanism may be set up, tested out, adjusted, and the like independent of the machine. Also by this structure the spindle and clutch mechanism can be replaced as a unit without in anywise affecting or being affected by the remaining structural elements of the machine proper. Suitable members such as the bushings or bearings 39 and 40 serve to satisfactorily rotatably support the spindle and its associate parts in position within the machine.

I claim:

1. A clutch mechanism including a sleeve having a clutch spider portion and a contained spindle, the spider having clutch elements loosely associated therewith and the spindle having additional clutch elements mounted thereon and in co-operative relation to the clutch elements of the spider, the series of clutch elements being axially shiftable as an entirety on the spindle, a clutch finger hub secured on the spindle adjacent said parts, clamping fingers pivoted to said hub and provided with cam portions for operatively engaging certain of the clutch elements to exert a clamping action thereagainst, means on the spindle for shifting said fingers into and out of clamping position, and a compression spring supported by the spindle in position to engage the clutch elements and resist axial movement of the clutch as an entirety when clamping pressure is applied through the movement of the fingers.

2. A clutch mechanism for machine tool structures including a sleeve having a clutch spider portion and a contained spindle, the spider having clutch elements loosely associated therewith and the spindle having additional clutch elements mounted thereon for co-operation with the clutch elements of the spider, the series of clutch elements being axially shiftable as an entirety on the spindle, a clutch finger hub secured on the spindle adjacent said parts, clamping fingers pivoted to said hub and provided with cam portions for operatively engaging certain of the clutch elements to exert a clamping action against same, means on the spindle controlling movement of said fingers into and out of clamping position, and a compression spring supported by the spindle in position to engage the clutch elements and oppose axial movement of the clutch as an entirety when clamping pressure is applied through the movement of the fingers, said spring being received and protected within a portion of the sleeve of the machine tool.

3. A clutch mechanism for a machine tool structure, including a sleeve having a clutch spider portion and a contained spindle, the spider having clutch elements loosely associated therewith and the spindle having additional clutch elements mounted thereon for co-operation with the clutch elements of the spider, the series of clutch elements being axially shiftable as an entirety on the spindle, a clutch finger hub secured on the spindle adjacent said parts, clamping fingers pivoted to said hub and provided with cam portions for operatively engaging certain of the clutch elements to axially shift same on the spindle, means on the spindle for shifting said fingers into clamping position, a spring supported by the spindle in position to engage the clutch elements and oppose axial movement of the clutch as an entirety when pressure is applied through the movement of the fingers, said spring being received and protected within the sleeve of the machine tool, and means terminally accessible through the sleeve for adjusting the pressure of said spring.

LESTER F. NENNINGER.